United States Patent [19]
Parrino

[11] 3,884,547
[45] May 20, 1975

[54] KALEIDOSCOPE

[76] Inventor: George Parrino, 98 Riverside Dr., New York, N.Y. 10024

[22] Filed: Apr. 18, 1974

[21] Appl. No.: 461,864

[52] U.S. Cl. .................................................. 350/5
[51] Int. Cl. ........................................... G02b 27/08
[58] Field of Search ..................... 350/4, 5; 353/2, 1

[56] References Cited
UNITED STATES PATENTS

| | | | |
|---|---|---|---|
| 151,005 | 5/1874 | Bush | 350/5 |
| 2,991,689 | 7/1961 | Taylor | 350/5 |
| 3,242,799 | 3/1966 | Beverett | 350/5 |

*Primary Examiner*—Samuel S. Matthews
*Assistant Examiner*—Alan Mathews

[57] ABSTRACT

A kaleidoscope is provided with a storage compartment for a multiplicity of pattern producing objects which is frictionally attached to and is removable from the viewing end of the tubular body. The storage compartment has a removable cover and permits the storing and replacing of the pattern producing objects in such storage compartment. The revolvable member at the objective end of the kaleidoscope has a chamber for a plurality of pattern producing objects with a removable translucent cover to permit the objects within this chamber to be changed and replaced at the will of the user to produce an endless variety of designs and patterns as the member is revolved.

10 Claims, 2 Drawing Figures

PATENTED MAY 20 1975

3,884,547

KALEIDOSCOPE

BACKGROUND OF THE INVENTION

This invention relates to kaleidoscopes and in particular to a novel means of storing the pattern producing objects within a compartment which is removably attached to the viewing end of the tubular body so that the pattern producing objects so stored may be replaced at the will of the user and be used and replaced in the objective and revolvable end of the kaleidoscope.

Kaleidoscopes of many forms and embodiments are well known in the art. These prior art devices include a tubular body part having an eye piece at a first end and a rotatable head at the opposite or second end. The body part has a V-shaped reflector mounted in it which runs between the eye piece and into the second or revolving end. The head generally includes a section containing a number of pattern producing objects which rotate with the head. As the head rotates, the pattern producing objects tumble within the head and produce constantly changing mirror images of symmetrical patterns obtained from the reflector within the body part.

In many prior art kaleidoscopes the small pattern producing objects in the revolvable head are sealed therein. While the patterns viewed change as the head is revolved, the objects within the head cannot be changed by the user. Other kaleidoscopes permit the changing of the head, such as in U.S. Pat. No. 2,991,689 but does not provide a storage chamber for the pattern producing objects which can be removably attached to the eye piece or first end of the device so that it is always available to the user should he desire to change the pattern producing objects in the compartment of the revolving head at the objective end of the device.

When parts of a device or parts usable with a device are not attached directly to the device, such parts in time are generally lost or misplaced and the device becomes less effective or useless. This is true, especially where children use the device.

It is, therefore, a prime object of this invention to removably attach directly to the device a storage compartment for the pattern producing objects so that it has a definite place and position on the device.

Another object of this invention is to provide a removable cover for the storage compartment so that the pattern producing objects may be easily removed, replaced, added to, or changed at the will of the user for ready use with the revolvable head at the opposite or objective end of the device.

A further object of the invention is to provide a removable cap for the compartment that houses the pattern producing objects in the revolvable head so that the user may readily change the pattern producing objects within the revolvable head with pattern producing objects stored in the storage compartment at the opposite or eye piece end of the device.

Other objects of the invention will be apparent to those who are familiar with the art in the light of the following description and accompanying drawings.

With the above objects in view, the invention resides in the novel features, construction, arrangement and combination of parts presently described and claimed.

DESCRIPTION OF THE PREFERRED EMBODIMENT

Figure 1:
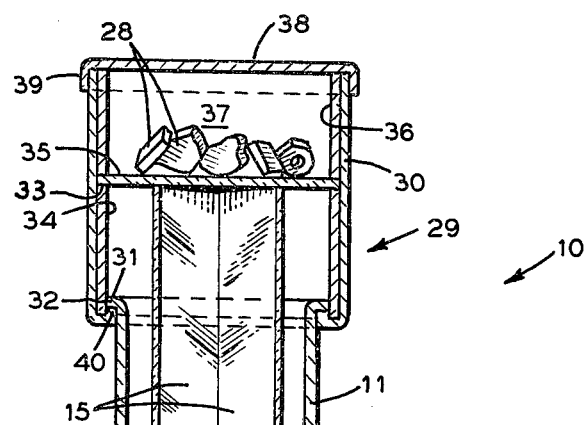
FIG. 1 is a longitudinal sectional view, partly in section, of the kaleidoscope.

Referring to FIG. 1, reference numeral 10 indicates a kaleidoscope comprising an elongated tubular body or shell 11 provided at one end with sheet metal bottom closure wall 12 having a dependant flange and a central aperture 13. Closure wall 12 is preferably held in position by use of an adhesive at the flange where it meets the inside face of shell 11. Disposed in facewise engagement with closure wall 12 is a transparent cover plate 14 made of glass, or other suitable transparent material. Positioned within tubular body 11 and against cover plate 14 is a V-shaped compound mirror 15 of the type usually found in lakeidoscopes and which extends lengthwise from the cover plate 14 or so-called "eye piece" end forwardly toward the other or so-called "objective" end, as best seen in FIG. 1.

A tubular storage compartment unit 16 is adapted to frictionally and removably fit upon the "eye opening" end of the tubular body or shell 11 and comprises a bottom or closed end 17, preferably made of sheet metal, which is crimped over the end of the cylindrical outer wall 18 of compartment unit 16 forming a peripheral retainer band 19. A shoulder 20 is formed by securing within said compartment wall 18, preferably with an adhesive, a first tubular collar 21 which is somewhat shorter than wall 18 so that shoulder 20 acts as a stop against the eye piece end of shell 11. The inner surface 22 of circular collar or flange of the upper end of wall 18 forms a snug-fitting frictional engagement with the outer circumferential end of the tubular body or shell 11 permitting the storage compartment unit 16 to be manually removed from the tubular body 11 at the will of the user. Shoulder 22 seats upon removable cover 25 to close chamber 26 which is used for housing a multiplicity of pattern producing objects 28 of irregular shape and of a variety of materials, such as small pieces of colored glass or plastic, pieces of wood, stone, metal, rubber and the like. Cover 25 has an attached short finger piece 27 which may be foldable or flexible and is used for lifing the cover to gain access to chamber 26 for removing the pattern producing objects, replacing same and adding and storing additional objects by the user.

At the end opposite the so-called eye piece end, the objective end is a non-removable revolvable unit 29 of slightly larger diametrical size in overlapping relationship and projecting axially outwardly from said tubular body 11 and which comprises an outer cylindrical wall 30, preferably made of sheet metal, and which extends beyond the end 31 of said tubular shell 11. End 31 is crimped outwardly creating an annular outer band 32. A first shoulder 33 is formed by securing within wall 30, preferably with an adhesive, a tubular collar 34 which is about one-half the height of wall 30 so that it acts as a stop for a circular flat transparent wall 35. Another tubular collar 36 is secured within wall 30 preferably with an adhesive, and is of a height from the upper face of transparent wall 35 to the top edge of wall 30 thus firmly securing wall 35 against displacement. The lower end of wall 30 is crimped inwardly and over the lower end of collar 34 forming an inward peripheral retainer band 40 which coacts with annular outer band 32 permitting unit 29 to revolve around the tubular body 11 and prevents unit 29 from being removed from the body 11.

The V-shaped mirror 15 extends to the flat transparent wall 35. Between wall 35 and the outer end of wall 30 is a compartment or chamber 37 for housing the patterns producing objects 28. A removable cap or cover 38, preferably made of a transparent or translucent flexible polyethylene plastic material to permit light to diffuse and permeate therethrough, has a depending outer flange 39 which fits snugly around the outer end of wall 30 and acts as a closure for the end of the revolvable unit 29 and as the cap or cover for chamber 37.

It is a simple matter for the user of the kaleidoscope to remove cover 38 to replace or add different pattern producing objects which partially fill and are loosely disposed within chamber 37 to produce an infinite variety of symmetrical designs as unit 29 is manually revolved by the user.

The pattern producing objects may be taken by the user from the storage chamber 26 by first removing the storage unit 16 from the body 11 and then lifting cover plate 25 to gain access to chamber 26.

During use of the kaleidoscope, the storage unit 16 remains off the kaleidoscope or wall 11 so that the user may look through the aperture 13. By manually turning the unit 29 the objects within chamber 37 will tumble around the said chamber so that when the user looks through the aperture 13 he will see the reflected objects 28 form into symmetrical and beautiful pattern designs. Of course, when he stops the revolution of unit 29 the pattern will remaind stationary.

Figure 2:
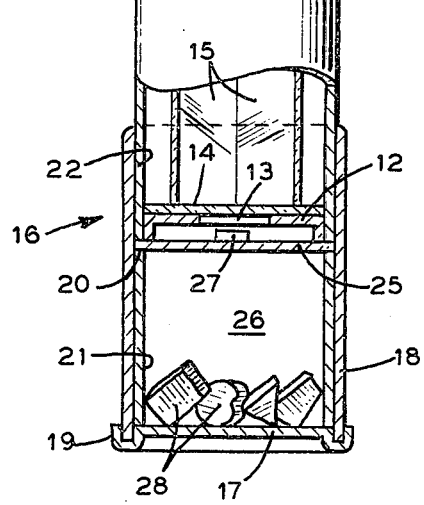
FIG. 2 is a longitudinal sectional view of a modified storage compartment, showing it seated upon the lower or "eye opening" end of the kaleidoscope.
Figure 2:
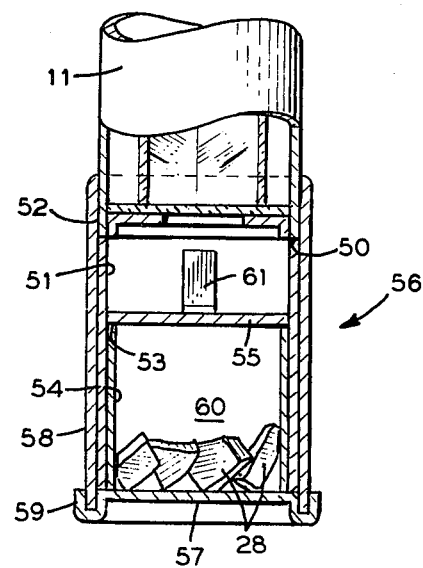

The modified storage compartment unit 56 shown in FIG. 2 comprises a bottom or closed end 57, preferably made of sheet metal, which is crimped over the lower end of the cylindrical outer wall of compartment unit 56 and a first inner collar 51 which is somewhat shorter than the outer wall 58 at its top edge and extends to the lower edge of wall 58 and forms a peripheral retainer band 59. The top edge 50 acts as a shoulder and stop for the end of the eye piece or shell 11. The inner surface 52 of the circular flange or collar of the upper end of wall 58 forms a snug-fitting frictional engagement with the outer circumferential lower eye piece end of the tubular body or shell 11 permitting the storage compartment unit 56 to be manually removed from the tubular body 11 at the will of the user.

A second shoulder 53 is formed by securing within compartment unit 56 and against tubular collar 51, preferably by use of an adhesive, a second tubular collar 54 which is somewhat shorter than collar 51. Shoulder 53 acts as a stop for removable cover 55 to close chamber 60 which is used for housing the pattern producing objects 28. Cover 55 has attached thereto a short flexible or foldable finger piece 61 which is used for lifting cover 55 to gain access to chamber 60. In practically all respects the modified storage compartment unit 56 is the same as the storage compartment unit 16 except for two shoulders 50 and 53 formed by the two collars 51 and 54 instead of the one shoulder 20 and collar 21.

It will be understood that various changes and modifications in the form, construction, arrangement and combination of the several parts of the kaleidoscope can be made and substituted for those herein shown and described without departing from the nature and principle of the invention.

What is claimed is:

1. A kaleidoscope comprising an elongated tubular body of circular cross-section,
   a. said body having an eye opening at one end,
   b. a revolvable unit of slightly larger diametrical size in overlapping relationship and projecting axially outwardly from said body at the opposite end, said revolvable unit having an outer wall
   c. a transparent wall extending closurewise across a portion of said revolvable unit providing a recessed chamber at the end of said unit for holding a multiplicity of loosely assorted small pattern producing objects of irregular shapes,
   d. a removable closure cap at the end of said unit in snug-fitting engagement with the outside surface of said outer wall of said revolvable unit permitting a user to change and replace said objects within said chamber at will,
   e. a V-shaped reflector within said tubular body between said eye opening and said transparent wall,
   f. a tubular storage compartment unit for holding said objects, said storage unit having a tubular outer wall with a projecting collar at one end and a bottom at its opposite end,
   g. said projecting collar of said storage compartment unit adapted to frictionally, snugly and removably fit upon the viewing end of said tubular body,
   h. a shoulder within said storage compartment unit within said tubular outer wall of said storage compartment unit, a removable cover which seats upon said shoulder,
   i. said removable cover closing the interior of said storage compartment unit when it is placed in position upon said shoulder, said storage compartment unit used for storing and retaining said pattern producing objects therein,
   j. means on said removable cover for lifting said cover from said storage compartment unit permitting a user to store and replace said pattern producing objects.

2. The kaleidoscope according to claim 1 wherein said removable closure cap is translucent.

3. The kaleidoscope according to claim 1 wherein said transparent cover of said revolvable unit is held in firm position by upper and lower tubular collars having their outer dimensions the same as the inner dimension of said outer wall.

4. The kaleidoscope according to claim 1 wherein said shoulder within said storage compartment unit is formed by a tubular collar of the same outer dimension as the inner dimension of said outer wall of said storage compartment unit.

5. The kaleidoscope according to claim 1 wherein said removable cover, when seated upon said shoulder, acts as a stop for said eye opening end of said kaleidoscope.

6. A kaleidoscope comprising an elongated tubular body of circular cross-section,
   a. said body having an eye opening at one end.
   b. a revolvable unit of slightly larger diametrical size in overlapping relationship and projecting axially outwardly from said body at the opposite end said revolvable unit having an outer wall c. a transparent wall extending closurewise across a portion of said revolvable unit providing a recessed chamber at the end of said unit for holding a multiplicity of loosely assorted small pattern producing objects of irregular shapes, d. a removable closure cap at the end of said unit in snug-fitting engagement with the outside surface of said outer wall of said revolvable unit permitting a user to change and replace said objects within said chamber at will, e. a V-shaped reflector within said tubular body between said eye opening and said cover, f. a tubular storage compartment unit for holding said objects, said unit having a projecting collar at one end and a bottom at its opposite end, g. said projecting collar of said storage compartment unit addapted to frictionally, snugly and removably fit upon the viewing end of said tubular body, h. a first shoulder within said compartment unit adjacent the end of said collar, said first shoulder acting as a stop against said eye opening end of said tubular body, i. a second shoulder within said compartment unit, said second shoulder below said first shoulder acting as a stop, j. a removable cover which seats upon said second shoulder and closes said storage compartment unit which stores and retains said objects, k. a finger tab attached to said cover for lifting and removing said cover from said storage compartment unit to permit a user to store and replace said objects.

7. The kaleidoscope according to claim 6 wherein said first shoulder of said storage compartment unit is formed by a tubular collar of the same outer dimension as the inner dimension of said outer wall of said storage compartment unit.

8. The kaleidoscope according to claim 6 wherein said second shoulder of said storage compartment unit is formed by a second tubular collar of the same outer dimension as the inner dimension of said first tubular collar.

9. The kaleidoscope acording to claim 1 wherein said transparent wall of said revolvable unit is held in fixed position between tubular collars within said revolvable unit.

10. The kaleidoscope according to claim 1 including a tubular collar within said storage compartment wherein the top of said tubular collar is said shoulder which seats said removable cover.

* * * * *